(No Model.)
R. L. WATKINS.
METAL AND CIRCUIT DETECTOR.
No. 438,041. Patented Oct. 7, 1890.
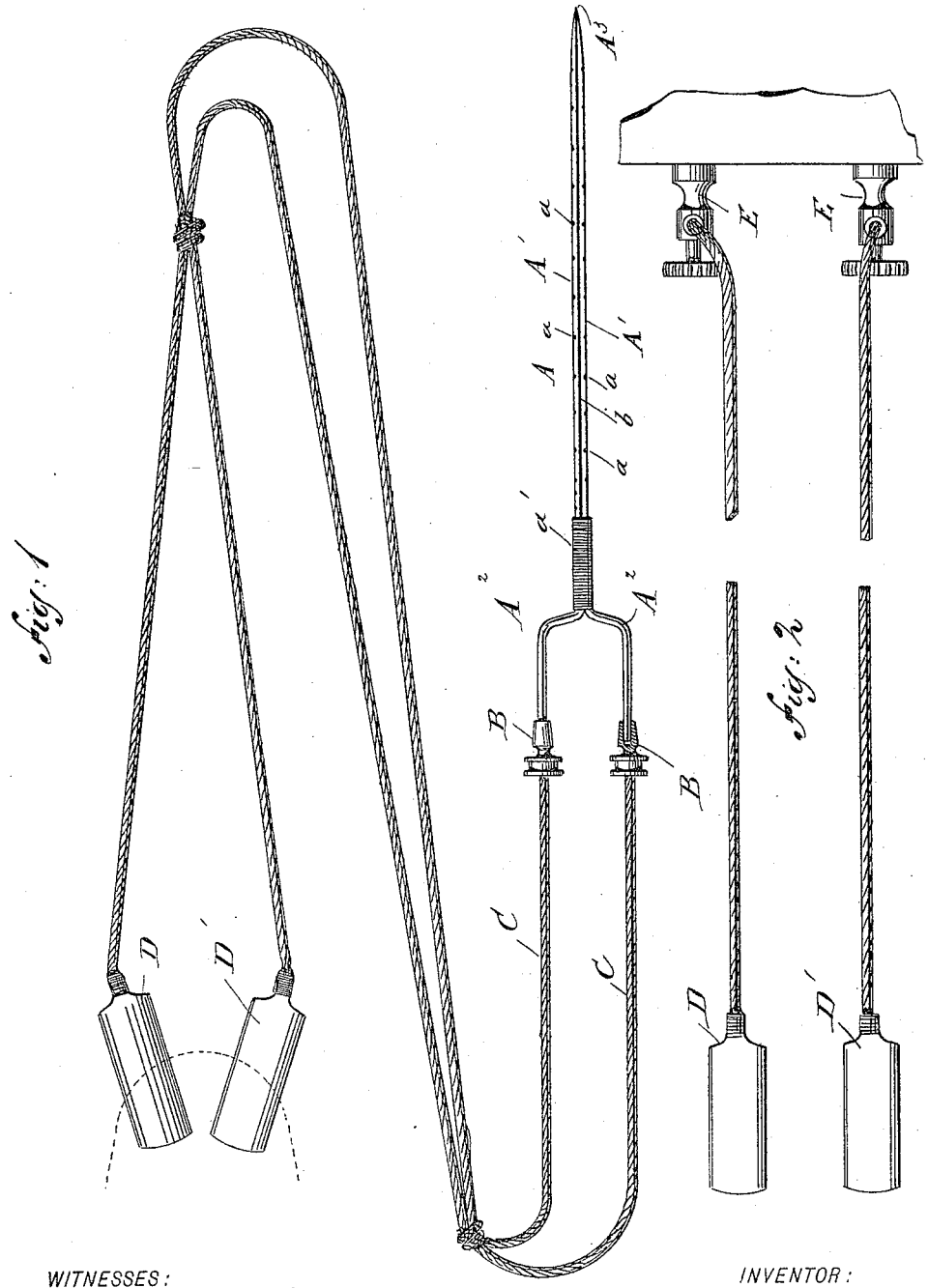

UNITED STATES PATENT OFFICE.

ROBERT L. WATKINS, OF NEW YORK, N. Y.

METAL AND CIRCUIT DETECTOR.

SPECIFICATION forming part of Letters Patent No. 438,041, dated October 7, 1890.

Application filed May 10, 1890. Serial No. 351,247. (No model.)

*To all whom it may concern:*

Be it known that I, ROBERT L. WATKINS, of the city, county, and State of New York, have invented a new and Improved Metal and Circuit Detector, of which the following is a full, clear, and exact description.

My invention relates to improvements in metal and circuit detecting devices; and the object of my invention is to produce a device by means of which the position of a piece of metal in the body may be accurately located, and by means of which, also, various devices—such, for instance, as telephones, telegraph-transmitters, electric-light wires, and other similar devices—may be tested to see whether or not they are in circuit, or to ascertain the strength of the current.

To this end my invention consists in certain features of construction and combinations of parts, which will be hereinafter fully described, and pointed out in the claims.

Reference is to be had to the accompanying drawings, forming a part of this specification, in which similar letters of reference indicate corresponding parts in both the figures.

Figure 1 is a detail view of the device, one of the terminals being shown in section, and Fig. 2 is a detail view of a portion of the device, showing the terminals of the conducting-wires connected with the binding-post of a telegraph-transmitter.

The probe A is composed of the two semi-cylindrical and parallel members $A'$, which are united together by small insulated rivets at the points $a$, and which are also bound together by the insulated cord $a'$. The members $A'$ are insulated from each other by suitable insulating material $b$, any well-known material being used, and the probe is provided at one end with a fine point $A^3$ to enable it to be easily inserted in a wound. The members $A'$ may also have their inner surfaces coated with copper, and may be stuck together with rubber cement, which will serve to hold the members together, and which will also insulate them from each other. At the end opposite the point $A^3$ the members $A'$ are bent outwardly from each other, and then extend in a parallel direction, the ends of the portions $A^2$ being adapted to engage the terminals B. The terminals B are of metal and are similar to those used in ordinary electric batteries. The terminals B are connected by insulated conducting-wires C to the mouth-pieces or electrodes D and $D'$, one of said mouth-pieces being of zinc and the other of copper. The mouth-pieces D and $D'$ are small oval pieces, and are adapted to be held in opposite sides of the mouth, as indicated at the dotted lines in Fig. 1.

The action of the alkali upon copper and zinc plates is well known, and when the mouth-pieces D and $D'$ are inserted in the mouth, the moisture of the mouth acting upon the mouth-pieces will form a mild battery. In inserting the mouth-pieces in the mouth care should be taken that they do not touch.

The device is operated as follows: The mouth-pieces D and $D'$ are inserted in the mouth, the terminals B are attached to the ends $A^2$ of the probe A, and the probe is inserted in the wound, and when the point of the probe comes in contact with the metal in the wound the two ends of the members $A'$ composing the probe will be thereby united, thus completing the circuit, and the electric current thereby resulting can be tasted, and a flash of light will also be at the same time discernible.

It will be seen from the foregoing description that as the two members $A'$ of the probe are brought to a very fine point the circuit will be sure to be completed upon said point being brought in contact with the metal.

To test instruments or wires of various kinds to see whether or not they are in circuit the probe is detached from the terminals B, and the terminals are connected with the parts supposed to be in circuit, the mouth-pieces D and $D'$ are inserted in the mouth, and if the parts touched by the terminals are in circuit the current will pass through the wires C and through the mouth-pieces so that the current will be tasted in the mouth. The device may be also used to find out whether or not a given substance is a good conductor by inserting the mouth-pieces in the mouth and touching both the terminals B to the substance, and if the substance is a good conductor the mild current generated by the mouth-pieces will pass through the conductor and the current will be tasted, as before.

While I have described the electrodes or mouth-pieces D and $D'$ as being composed of zinc and copper, respectively, it is obvious that other metals or substances negative to each other may be used for the purpose—such, for instance, as zinc and platinum, zinc and silver, &c.

Having thus fully described my invention, I claim as new and desire to secure by Letters Patent—

1. In a metal and circuit detector, the combination, with a probe composed of two insulated parts, of two mouth-pieces composed of metals, one positive and the other negative, and suitable conducting-wires connecting said mouth-pieces with the ends of the probe, substantially as described.

2. In a metal and circuit detector, the combination, with a probe formed of two parallel members insulated from each other and provided with outwardly-extending ends and a terminal point, of two mouth-pieces composed of copper and zinc, respectively, and suitable conducting-wires connecting said mouth-pieces with each of the members of the probe, substantially as described.

3. In a metal and circuit detector, a probe formed of parallel members, said members having their inner surfaces coated with copper and fastened together with rubber cement, substantially as described.

4. In a metal and circuit detector, the combination, with a probe composed of two members insulated from each other and formed at one end into a point and spread at the opposite end, of two mouth-pieces composed, respectively, of copper and zinc, suitable conducting-wires attached to said mouth-pieces, and suitable terminals fixed to the ends of the said conducting-wires and adapted to engage the members of the probe, substantially as described.

ROBERT L. WATKINS.

Witnesses:
WARREN B. HUTCHINSON,
EDWARD M. CLARK.